3,737,414
BIURET-POLYETHYLENIMINE RESINS
Alvin Francis Beale, Jr., Lake Jackson, Tex., assignor to The Dow Chemical Company, Midland, Mich.
No Drawing. Filed Mar. 8, 1972, Ser. No. 232,909
Int. Cl. C08g 22/02; A01g 29/00; C05g 3/00
U.S. Cl. 260—77.5 C                    11 Claims

ABSTRACT OF THE DISCLOSURE

Resins of polyethylenimines having a molecular weight of at least 300 and biuret are prepared by heating and reacting them in an inert organic solvent in which the resin is insoluble until 1.4 to 2.0 moles of ammonia per mole of biuret are given off.

The resins slowly degrade in water and are useful to encapsulate insecticides and fertilizers.

BACKGROUND OF THE INVENTION

This invention relates to a moldable resin comprising the reaction product of a polyethylenimine and biuret and a process of making the same.

It is known from U.S. Pats. 3,234,025; 3,345,253; 3,617,440 and German Pat. 907,698 that urea and polyethylenimines can be condensed to form condensation products that are readily soluble in water.

The products of these prior processes suffer from the the disadvantage that the condensation products are not thermoplastic and moldable.

SUMMARY OF THE INVENTION

It now has been found that polyalkylenimines of a particular molecular weight range, i.e. those having a molecular weight of at least 300, can be reacted with biuret to form thermoplastic, i.e. moldable, resins which are substantially water insoluble yet they degrade over a period of days or hours in contact with water at ambient temperatures.

The resins of this invention are useful to encapsulate insecticides, fertilizers and the like to provide long lasting effects when placed near plants requiring such treatment.

Thus, the present invention comprises a thermoplastic resin comprising the reaction product of a polyethylenimine (P.E.I.) having a molecular weight of at least 300 and biuret wherein the PEI and biuret are reacted as evidenced by the generation of ammonia. Preferably, the reaction continues until 1.4 to 2.0 moles of ammonia are driven off per mole of biuret.

The process aspects of the invention relate to the process of forming the resinous reaction product in which the steps comprise forming a solution of PEI having a molecular weight of at least about 300 and biuret in an inert organic solvent in which the resin is insoluble wherein the weight ratio of PEI to biuret is in the range from 0.5:1 to 2.5:1.

DETAILED DESCRIPTION

The anhydrous polyethylenimines used in this invention are commercially available. The average molecular weight of the PEI used in this invention can vary from about 300 to about 6000.

The biuret used can be a technical grade biuret having about 90% by weight of biuret with the remainder largely urea and triuret. Best results are obtained with a high purity product having greater than about 98% by weight biuret.

The above are reacted together at a weight ratio of PEI to biuret in the range from 0.5:1 to 2.5:1. The preferred range is from 0.7:1 to 1.3:1.

It is necessary to use an inert organic solvent for the reactants in which the resinous reaction product is insoluble. Useful solvents are dimethylformamide, dimethyl sulfoxide, monoalkyl ethers of glycols, glycols and polyglycols, monoalkyl ethers of polyglycols and cyclic polyglycol ethers. Examples of these glycol ethers are ethylene glycol ethyl ether, ethylene glycol methyl ether, ethylene glycol n-butyl ether, diethylene glycol methyl ether, diethylene glycol ethyl ether, diethylene glycol n-butyl ether, propylene glycol methyl ether, dipropylene glycol methyl ether, ethylene glycol, dipropylene glycol, and the like.

Examples of the cyclic polyglycol ethers are the cyclic trimer, tetramer, pentamer and hexamer of ethylene oxide. The cyclic tetramer is preferred.

The above reactants are heated in one of the above solvents or a mixture thereof to a temperature in the range from about 110° to about 170° C. and preferably from about 120° to 155° C., for 0.5 to 16 hours with a constant inert gas purge such as nitrogen, argon, methane, ethane, propane, or mixtures thereof, to remove the ammonia which is generated.

It is important that the reaction be continued until substantially all the biuret is reacted. The course of the reaction is followed my scrubbing and titrating the effluent gas with a dilute acid such as sulfuric or hydrochloric acid. It is to be understood that the heating period and the temperature of the reaction are inversely related within the broad ranges such that a shorter period of heating can be used with a higher temperature and vice versa.

Useful resins are obtained when the reaction is continued until more than about 1.4 moles of ammonia per mole of biuret are generated. If the reaction does not continue until about 1.4 moles of ammonia are generated, the resin will be soft and difficult to separate from the solvent and not desirable.

The following examples are presented to further illustrate but not limit the invention.

EXAMPLES 1–17

Into a 500 cc. Pyrex reactor in an oil bath and equipped with a stirrer and a nitrogen purge is placed 55 grams of polyethylenimine (P.E.I.) having a molecular weight of 300 and 58 grams of biuret.

Then, 400 ml. of dimethyl formamide is added with stirring and the temperature is raised to 130° C. and maintained at this temperature for about 4.5 hours. The ammonia gas generated is removed from the reactor with nitrogen gas and titrated in a gas scrubber with 7.6 N sulfuric acid to monitor the reaction. After 1.89 moles of ammonia gas had been given off, the heat was turned off and the reactor was allowed to cool.

The precipitated resin in a particulate form, was then filtered out, washed with a volume of water sufficient to slurry the solids and allowed to dry into fine granules. The yield was 90.4 grams or 97%.

Following the above procedure with variations in the reactants, solvents, time, etc. the results shown in Table I were obtained which includes the above for comparison.

TABLE I

| Example | Mol. wt. P.E.I. (×100) | Wt. ratio P.E.I./biuret | Solvent | Temp. (° C.) | Reaction time (hours) | Moles NH$_3$ per mole biuret | Comments |
|---|---|---|---|---|---|---|---|
| 1 | 3 | 0.95 | DMF | 130 | 4.5 | 1.89 | 97% yield. |
| 2 | 3 | 1.3 | DMF | 132 | 2.0 | 2.00 | |
| 3 | 3 | 1.0 | DMF | 132 | 1.75 | 1.6 | |
| 4 | 3 | 0.7 | DMF | 130 | 4.5 | <1.7 | |
| 5 | 3 | 1.3 | DMF | 135 | 1.5 | 1.88 | |
| 6 | 3 | 1.0 | DGB | 132 | 5.0 | 1.81 | 95.6% yield. |
| 7 | 3 | 1.0 | DGM | 145 | 2.0 | 1.84 | >98% yield. |
| 8 | 3 | 1.0 | DPG | 131 | 5.0 | 1.84 | Do. |
| 9 | 3 | 1.0 | DGB | 130 | 5.0 | 1.8 | 93.3% yield. |
| 10 | 3 | 1.3 | DGM | 135 | 2.0 | 1.88 | 93.7% yield. |
| 11 | 3 | 1.0 | DGM | 152 | 2.0 | 1.88 | >98% yield. |
| 12 | 3 | 1.5 | DGM | 133 | 4.0 | 1.88 | Do. |
| 13 | 3 | 1.7 | DGM | 133 | 4.0 | 1.88 | 92% yield. |
| 14 | 3 | 2.0 | DGM | 133 | 6.0 | 1.8 | >98% yield. |
| 15 | 6 | 1.1 | DMF | 130 | 5.0 | 1.95 | |
| 16 | 12 | 1.1 | DMF | 132 | 6.0 | 1.80 | |
| 17 | 18 | 0.91=1 | DGM | 135 | 5.0 | 1.82 | >98%. |
| Control | 3 | 1.0 | TEG | 132 | 1.0 | 1.0 | Unmanageable glob. |

DMF=dimethyl formamide.
DGM=diethylene glycol methyl ether.
TEG=triethylene glycol dimethyl ether.
DPG=dipropylene glycol.
DGB=diethylene glycol n-butyl ether.

EXAMPLE 18

The resinous granules prepared in Examples 1, 15 and 16 were compression molded into wafers at 150° C., in a hydraulic press at 8000 pounds per square inch. These wafers were then placed in water at room temperature. The wafer from Example 1 was slowly degraded over a period of 24 hours. Example 16 was less resistant and lasted 8 hours. Example 17 was the worst and degraded rapidly after the first hour.

With increased residence time at a lower temperature a longer lasting resin, i.e. up to seven days can be obtained.

Following the above examples, various well known insecticides and fertilizers are blended with the copolymer granules before the molding step to produce long lasting pellets having a controlled degradability.

I claim:

1. A thermoplastic resin comprising the reaction product of a polyethylenimine having a molecular weight of at least 300 and biuret wherein the polyethylenimine and biuret are reacted until 1.4 to 2 moles of ammonia per mole of biuret are given off.

2. A resin as set forth in claim 1 in which the polyethylenimine has a molecular weight of 300.

3. A resin as set forth in claim 1 in which the polyethylenimine has a molecular weight of 600.

4. A resin as set forth in claim 1 in which the polyethylenimine has a molecular weight of 1200.

5. A resin as set forth in claim 1 in which the polyethylenimine has a molecular weight of 1800.

6. A thermoplastic resin comprising the reaction product of a polyethylenimine having a molecular weight of at least 300 and biuret wherein the polyethylenimine and biuret are heated in an inert solvent in a weight ratio in the range from 0.5:1 to 2.5:1 polyethylenimine to biuret until more than 1.4 moles of ammonia is generated.

7. A resin as set forth in claim 6 in which the weight ratio is in the range from 0.7:1 to 1.3:1.

8. A resin as set forth in claim 6 in which the polyethylenimine has a molecular weight of 300.

9. A resin as set forth in claim 6 in which the polyethylenimine has a molecular weight of 600.

10. A resin as set forth in claim 6 in which the polyethylenimine has a molecular weight of 1200.

11. A resin as set forth in claim 6 in which the polyethylenimine has a molecular weight of 1800.

References Cited

UNITED STATES PATENTS

| 3,345,253 | 10/1967 | Bestian et al. | 162—166 |
| 3,234,025 | 2/1966 | Van Hoof et al. | 96—95 |
| 3,399,110 | 8/1968 | Sommer et al. | 162—190 |
| 3,476,709 | 11/1969 | Jones | 260—77.5 |
| 3,519,687 | 7/1970 | Schneider et al. | 260—570.4 |

FOREIGN PATENTS 763,506  7/1967  Canada.

DONALD E. CZAJA, Primary Examiner

H. S. COCKERAM, Assistant Examiner

U.S. Cl. X.R.

47—48.5; 71—27, 64 F; 260—2 EN